United States Patent
Cherubini et al.

(10) Patent No.: US 8,840,056 B2
(45) Date of Patent: Sep. 23, 2014

(54) OPERATING A REEL-TO-REEL SYSTEM

(75) Inventors: Giovanni Cherubini, Rueschlikon (CH); Evangelos S. Eleftheriou, Rueschlikon (CH); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/896,183

(22) Filed: Oct. 1, 2010

(65) Prior Publication Data

US 2011/0134562 A1 Jun. 9, 2011

(30) Foreign Application Priority Data

Dec. 9, 2009 (EP) .................................... 09178555

(51) Int. Cl.
*B65H 23/18* (2006.01)
*G11B 15/32* (2006.01)

(52) U.S. Cl.
CPC ..................................... *G11B 15/32* (2013.01)
USPC .................. 242/412.1; 242/334.3; 242/334.4; 242/420.5

(58) Field of Classification Search
CPC ......... G11B 15/32; G11B 15/43; G11B 15/46
USPC ............. 242/334.3, 334.4, 334.6, 412.1, 420, 242/420.5
See application file for complete search history.

(56) References Cited

U.S. PATENT DOCUMENTS

| 6,712,302 | B2 * | 3/2004 | Karp et al. | 242/334.4 |
|---|---|---|---|---|
| 6,754,026 | B1 | 6/2004 | Koski | |
| 7,231,317 | B2 * | 6/2007 | Todd et al. | 702/183 |
| 7,586,708 | B1 * | 9/2009 | Dugar et al. | 360/74.2 |
| 7,847,496 | B2 * | 12/2010 | Bui et al. | 318/68 |
| 2004/0051991 | A1 * | 3/2004 | Koski | 360/73.11 |
| 2009/0206190 | A1 * | 8/2009 | Bui et al. | 242/390.9 |

OTHER PUBLICATIONS

Priyadarshee D. Mathur, William C. Messner, "Controller Development for a Prototype High-Speed Low-Tension Tape Transport," IEEE Transactions on Control Systems Technology, Jul. 1998, pp. 534-542, vol. 6, No. 4, IEEE.

Shiba P. Panda, Andrew P. Engelmann; "Modeling and Control System Design of Reel-to-Reel Tape Drives," Proceedings of the American Control Conference, AK May 2002, pp. 927-933, IEEE.

* cited by examiner

*Primary Examiner* — William A Rivera
(74) *Attorney, Agent, or Firm* — Cantor Colburn LLP

(57) ABSTRACT

A method for operating a reel-to-reel system of a storage device with a first reel, a second reel, a first motor and a second motor, the first motor drives the first reel and the second motor drives the second reel. The system transports a tape supplied by one of the two reels and taken up by the other reel. A tape velocity and tape tension between the first and reels, and a longitudinal displacement are determined. An estimated state vector depends on the tape velocity, tape tension and longitudinal displacement. A reference state vector depends on a predetermined reference tape velocity and a predetermined reference tape tension. A first control signal and a second control signal are generated dependent on the estimated state vector and the reference state vector. The first motor is controlled by the first control signal and the second motor is controlled by the second control signal.

14 Claims, 5 Drawing Sheets

FIG 8a $$\mathbf{x}_m = \begin{bmatrix} x_1(t_m) \\ \dot{x}_1(t_m) \\ x_2(t_m) \\ \dot{x}_2(t_m) \end{bmatrix} \quad (F0)$$

$$\hat{\xi}_m = \begin{bmatrix} \hat{\xi}_1(t_m) \\ \hat{\xi}_2(t_m) \\ \hat{\xi}_2(t_m) \end{bmatrix} \quad (F2)$$

$$\frac{J_1}{R_1}\ddot{x}_1(t) = K_1 u_1(t) - \left\{ \frac{\beta_1}{R_1}\dot{x}_1(t) - R_1\{K_T[x_2(t) - x_1(t)](1-\mu) + D_T[\dot{x}_2(t) - \dot{x}_1(t)]\} \right\} \quad (F4)$$

$$\frac{J_2}{R_2}\ddot{x}_2(t) = K_2 u_2(t) - \left\{ \frac{\beta_2}{R_2}\dot{x}_2(t) + R_2\{K_T[x_2(t) - x_1(t)] + D_T[\dot{x}_2(t) - \dot{x}_1(t)]\} \right\} \quad (F6)$$

$$J_1 = J_{1,motor} + J_{1,clutch} + \pi \cdot wh \cdot \rho \left( \frac{R_1^4 - R_0^4}{2} \right) \quad (F8)$$

$$J_2 = J_{2,motor} + J_{2,clutch} + \pi \cdot wh \cdot \rho \left( \frac{R_2^4 - R_0^4}{2} \right) \quad (F10)$$

$$\dot{\mathbf{x}}_m = \mathbf{F}\mathbf{x}_m + \mathbf{G}\mathbf{u}_m \quad (F12)$$

$$\mathbf{u}_m = \begin{bmatrix} u_1(t_m) \\ u_2(t_m) \end{bmatrix} \quad (F14)$$

$$\mathbf{F} = \begin{bmatrix} 0 & 1 & 0 & 0 \\ -\dfrac{R_1^2 K_T(1-\mu)}{J_1} & -\dfrac{\beta_1 - R_1^2 D_T}{J_1} & \dfrac{R_1^2 K_T(1-\mu)}{J_1} & -\dfrac{R_1^2 D_T}{J_1} \\ 0 & 0 & 0 & 1 \\ \dfrac{R_2^2 K_T}{J_2} & \dfrac{R_2^2 D_T}{J_2} & -\dfrac{R_2^2 K_T}{J_2} & -\dfrac{\beta_2 - R_2^2 D_T}{J_2} \end{bmatrix} \quad (F16)$$

$$\mathbf{G} = \begin{bmatrix} 0 & 0 \\ \dfrac{R_1 K_1}{J_1} & 0 \\ 0 & 0 \\ 0 & \dfrac{R_2 K_2}{J_2} \end{bmatrix} \quad (F18)$$

$$\mathbf{y}_m = \begin{bmatrix} \hat{v}(t_m) \\ \hat{T}(t_m) \end{bmatrix} = \mathbf{H}\mathbf{x}_m + \mathbf{w}_m = \begin{bmatrix} 0 & \dfrac{1}{2} & 0 & \dfrac{1}{2} \\ -K_T & 0 & K_T & 0 \end{bmatrix} \mathbf{x}_m + \mathbf{w}_m \quad (F20)$$

FIG 8b $$\hat{\xi}_m = \overline{\xi}_m + \mathbf{L}(\sigma_\eta^2, \sigma_w^2)(\mathbf{y}_m - \Xi\,\overline{\xi}_m) \tag{F22}$$

$$\overline{\xi}_{m+1} = \Phi\hat{\xi}_m + \Gamma\mathbf{u}_m \tag{F24}$$

$$v_{nom} = \frac{\dot{x}_{1,ref,m} + \dot{x}_{2,ref,m}}{2} \tag{F26}$$

$$T_{nom} = K_T(x_{2,ref,m} - x_{1,ref,m}) \tag{F28}$$

$$\mathbf{u}_{int,m} = \begin{bmatrix} u_{1,aux}(t_m) \\ u_{2,aux}(t_m) \end{bmatrix} = \Im \cdot \boldsymbol{\sigma}_m = \begin{bmatrix} \alpha_I & -\beta_I \\ \alpha_I & \beta_I \end{bmatrix}\boldsymbol{\sigma}_m \tag{F30}$$

$$\boldsymbol{\sigma}_{m+1} = \boldsymbol{\sigma}_m + \begin{bmatrix} v_{nom} - \hat{v}_m \\ T_{nom} - \hat{T}_m \end{bmatrix} = \boldsymbol{\sigma}_m + \begin{bmatrix} e_{v,m} \\ e_{T,m} \end{bmatrix} \tag{F32}$$

$$\begin{bmatrix} \xi_{m+1} \\ \xi_{d,m+1} \end{bmatrix} = \begin{bmatrix} \Phi & \Gamma\begin{bmatrix} -g\mathbf{H}_d \\ g\mathbf{H}_d \end{bmatrix} \\ 0 & \Phi_d \end{bmatrix}\begin{bmatrix} \hat{\xi}_m \\ \hat{\xi}_{d,m} \end{bmatrix} + \begin{bmatrix} \Gamma \\ 0 \end{bmatrix}\mathbf{u}_m = \Phi_{aug}\begin{bmatrix} \hat{\xi}_m \\ \hat{\xi}_{d,m} \end{bmatrix} + \Gamma_{aug}\mathbf{u}_m \tag{F34}$$

$$\mathbf{y}_m = \begin{bmatrix} \Xi & 0 \end{bmatrix}\begin{bmatrix} \hat{\xi}_m \\ \hat{\xi}_{d,m} \end{bmatrix} + \mathbf{w}_m = \mathbf{H}_{aug}\begin{bmatrix} \hat{\xi}_m \\ \hat{\xi}_{d,m} \end{bmatrix} + \mathbf{w}_m \tag{F36}$$

$$\ddot{\eta}_i = -\varpi_i^2\,\eta_i,\quad i=1,\ldots,n \tag{F38}$$

$$\Phi_d = e^{\mathbf{F}_d T},\quad \mathbf{F}_d = \begin{bmatrix} 0 & 1 \\ -\omega_1^2 & 0 \end{bmatrix} \tag{F40}$$

$$\mathbf{H}_d = \begin{bmatrix} 1 & 0 \end{bmatrix} \tag{F42}$$

$$\begin{bmatrix} \hat{\xi}_m \\ \hat{\xi}_{d,m} \end{bmatrix} = \begin{bmatrix} \overline{\xi}_m \\ \overline{\xi}_{d,m} \end{bmatrix} + \mathbf{L}_{aug}(\sigma_\eta^2, \sigma_w^2)(\mathbf{y}_m - \Xi\,\overline{\xi}_m) \tag{F44}$$

$$\begin{bmatrix} \overline{\xi}_{m+1} \\ \overline{\xi}_{d,m+1} \end{bmatrix} = \begin{bmatrix} \Phi & \Gamma\begin{bmatrix} -g\mathbf{H}_d \\ g\mathbf{H}_d \end{bmatrix} \\ 0 & \Phi_d \end{bmatrix}\begin{bmatrix} \hat{\xi}_m \\ \hat{\xi}_{d,m} \end{bmatrix} + \begin{bmatrix} \Gamma \\ 0 \end{bmatrix}\mathbf{u}_m = \Phi_{aug}\begin{bmatrix} \hat{\xi}_m \\ \hat{\xi}_{d,m} \end{bmatrix} + \Gamma_{aug}\mathbf{u}_m \tag{F46}$$

$$\hat{\eta}(t_m) = g\,\mathbf{H}_d^{1\times 2}\hat{\xi}_{d,m} \tag{F48}$$

$$\hat{\eta}_m(t_m) = g\,\mathbf{H}_d\hat{\xi}_{d,m} \tag{F50}$$

OPERATING A REEL-TO-REEL SYSTEM

CROSS REFERENCE TO RELATED APPLICATIONS

This application claims priority to European Patent Application No. 09178555.0, filed 9 Dec. 2009, and all the benefits accruing therefrom under 35 U.S.C. §119, the contents of which are incorporated herein by reference in their entirety.

BACKGROUND

Embodiments of the present invention relate to a method and an apparatus for operating a reel-to-reel system of a storage device.

In "Modeling and Control System Design of Reel-to-Reel Tape Drives", by Shiba P. Panda and Andrew P. Engelmann, Proceedings of the American Control Conference (May 8-10, 2002), tape drives are disclosed in data measurement and computer systems to be used as backup drives and instrument recorders. A tape drive comprises, for example, a supply reel, a take-up reel, a tape guidance system and a read/write head. Each reel is controlled through its own DC brushless motor and currents of the reels makeup the system inputs. The tape drive is controlled via a developed model of the tape drive system.

The IEEE document "Controller Development for a Prototype High-Speed Low-Tension Tape Transport" by Priyadarshee D. Mathur and William C. Messner, IEEE Transactions on Control Systems Technology, Vol. 6, No. 4 (July 1998) describes that increasing storage densities on tape requires reduction of the magnetic coating thickness and very thin substrates are required to pack more tape in a given volume. High performance tape drives therefore must rely on high-speed and low-tension tape transports for ultra-thin media. In this context, regulation of tape speed and tape tension by controlling a torque applied to the supply reel and take-up reel is disclosed. Each reel is directly driven by a motor, and no capstan is used.

BRIEF SUMMARY

According to embodiments of the invention, a method and a corresponding apparatus for operating a reel-to-reel system of a storage device is provided, comprising a first reel, a second reel, a first motor and a second motor. The first motor is operable to drive the first reel and the second motor is operable to drive the second reel. The reel-to-reel system is operable to transport a tape which is supplied by one of the two reels and which is taken up by the other of the two reels. A current tape velocity of the tape and a current tape tension of the tape between the first reel and the second reel and a current longitudinal displacement of the tape are determined. The longitudinal displacement represents a supplied length of the tape with respect to a predetermined reference point positioned between the first reel and the second reel. An estimated state vector is estimated dependent on the determined tape velocity and on the determined tape tension and on the determined longitudinal displacement. A reference state vector is determined dependent on a predetermined reference tape velocity and on a predetermined reference tape tension. A first control signal and a second control signal are determined dependent on the estimated state vector and on the determined reference state vector. The first motor is controlled by the first control signal and the second motor is controlled by the second control signal.

This may facilitate a reliable joint control of the tape velocity and the tape tension of the reel-to-reel system. Furthermore, this may be suitable for a realization of a MIMO (multiple input multiple output) control using information from multiple sensors. The estimated state vector may be associated to a full-order model which represents the reel-to-reel system with a predetermined number of state variables. In this context, the estimated state vector preferably comprises as many vector elements as number of state variables in the full-order model. In this way, the estimated state vector may represent a current internal state of the reel-to-reel system comprising predetermined vector elements, as for example, a particular linear tape velocity at the first and at the second reel and a particular linear tape velocity at the first and at the second reel. The estimated state vector may be estimated based on a Kalman estimator dependent on the determined tape velocity and on the determined tape tension and on the determined longitudinal displacement. In particular, the tape velocity may represent a velocity in tape movement direction from the supply reel to the take-up reel. Each of the first and second control signals may, by way of example, represent a motor current to control a torque of the particular motor.

According to an embodiment, a predetermined set of matrices is selected from a predetermined selection of matrices dependent on the longitudinal displacement. The estimated state vector is estimated dependent on the selected set of matrices. The estimated state vector is preferably estimated dependent on the determined tape velocity and on the determined tape tension on the selected set of matrices which are selected dependent on the longitudinal displacement. By this, a noise variance of the reel-to-reel system is incorporated in the estimation of the estimated state vector, as radius and moment of inertia of the particular reel vary as the tape moves.

According to a further embodiment, predetermined matrices of the predetermined selection of matrices are selected dependent on the longitudinal displacement. At least one matrix of the predetermined set of matrices is interpolated based on the selected predetermined matrices. This may reduce a required storage capacity for storing the predetermined selection of matrices and still facilitates the estimation of the estimated state vector with incorporating the noise variance of the reel-to-reel system. The interpolation may, for example, be a linear interpolation.

According to a further embodiment, the estimated state vector is estimated dependent on the selected predetermined set of matrices in such a way that a number of vector elements of the estimated state vector is less than an order of a predetermined full-order model of the reel-to-reel system. In this context, the estimated state vector is associated to a reduced-order model of the reel-to-reel system and comprises a number of vector elements that is less than the number of state variables of the full-order model. This may reduce a complexity for controlling the reel-to-reel system.

According to a further embodiment, a controller matrix is selected from a predetermined selection of controller matrices dependent on the longitudinal displacement. The first control signal and the second control signal are determined dependent on the selected controller matrix. In this way, the noise variance of the reel-to-reel system is incorporated in the determination of the first control signal and the second control signal. The particular controller matrix may by way of example be implemented as an optimum linear quadratic Gaussian controller matrix.

According to a further embodiment, predetermined matrices of a predetermined selection of controller matrices are selected dependent on the longitudinal displacement. A controller matrix is interpolated based on the selected predetermined matrices. The first control signal and the second control signal are determined dependent on the interpolated controller matrix. This may reduce a required storage capacity for storing the predetermined selection of controller matrices. The interpolation may, for example, be a linear interpolation.

According to a further embodiment, an input reference matrix is selected from a predetermined selection of input reference matrices dependent on the longitudinal displacement. The reference state vector may be determined dependent on the selected input reference matrix. In this way, the noise variance of the reel-to-reel system may be incorporated in the determination of the first control signal and the second control signal. The reference state vector comprises the same number of vector elements as the estimated state vector.

According to a further embodiment, predetermined matrices of a predetermined selection of input reference matrices are selected dependent on the longitudinal displacement. An input reference matrix is interpolated based on the selected predetermined matrices. The reference state vector is determined dependent on the interpolated input reference matrix. This may reduce a required storage capacity for storing the predetermined selection of input reference matrices and still contributes to determining the first control signal and second control signal with incorporating the noise variance of the reel-to-reel system. The interpolation may for example be a linear interpolation.

According to a further embodiment, at least one input equivalent tension disturbance value of the tape is estimated dependent on the current tape velocity and on the current tape tension and on the current longitudinal displacement. The at least one input equivalent tension disturbance value represents at least one periodic tension disturbance of the tape. The first control signal and the second control signal are determined dependent on the at least one input equivalent tension disturbance value. By this, effects of eccentricities of at least one reel and/or other disturbances resulting in periodic tension disturbances can be incorporated in the control of the motors.

According to a further embodiment, a predetermined set of augmented matrices is selected from a predetermined selection of augmented matrices dependent on the longitudinal displacement. The at least one input equivalent tension disturbance value and the estimated state vector are estimated dependent on the selected set of augmented matrices. The estimation of the at least one input equivalent tension disturbance value may typically require an augmented model of the reel-to-reel system which preferably makes use of the augmented matrices. This contributes to reliably estimating the estimated state vector and additionally the at least one input equivalent tension disturbance value. Furthermore, the noise variance of the reel-to-reel system is incorporated in the determination of the estimated state vector and the at least one input equivalent tension disturbance value.

According to a further embodiment, predetermined matrices of the predetermined selection of augmented matrices are selected dependent on the longitudinal displacement. At least one matrix of the predetermined set of augmented matrices is interpolated based on the selected predetermined matrices. This may reduce a required storage capacity for storing the predetermined selection of augmented matrices and still contributes to determining the estimated state vector and the at least one input equivalent tension disturbance value with incorporating the noise variance of the reel-to-reel system.

According to a further embodiment, tape velocity deviation is determined dependent on the difference between the current tape velocity and a predetermined nominal tape velocity, which is associated to the predetermined reference tape velocity. Tape tension deviation is determined dependent on a difference between the current tape tension and a predetermined nominal tape tension, which is associated to the predetermined reference tape tension. The tape velocity deviation and the tape tension deviation are integrated and a first and a second auxiliary control signal are determined dependent on the integration of the tape velocity deviation and the tape tension deviation. The first control signal is determined dependent on the first auxiliary control signal. The second control signal is determined dependent on the second auxiliary control signal. This contributes to incorporating a mismatch between the current tape velocity being dependent on the estimated state vector of the reel-to-reel system and the predetermined nominal tape velocity, and a mismatch between the current tape tension being dependent on the estimated state vector of the reel-to-reel system and the predetermined nominal tape tension. The nominal tape velocity correlates to the reference tape velocity in such a way, that both velocities are based on a first predetermined linear tape velocity at the first reel and on a second predetermined tape velocity at the second reel. The nominal tape tension correlates to the reference tape tension in such a way, that both tensions are based on a first predetermined linear tape displacement at the first reel and on a second predetermined tape displacement at the second reel. The tape velocity deviation and the tape tension deviation may be jointly integrated.

According to a further embodiment, predetermined integration coefficients are selected from a predetermined selection of integration coefficients dependent on the longitudinal displacement. The tape velocity deviation and the tape tension deviation are integrated dependent on the selected integration coefficients. This may enable the incorporation of the noise variance of the reel-to-reel system.

According to a further embodiment, predetermined coefficients of a predetermined selection of integration coefficients are selected dependent on the longitudinal displacement. Integration coefficients are interpolated based on the selected coefficients and the tape velocity deviation the tape tension deviation are integrated dependent on the interpolated integration coefficients. This may reduce a required storage capacity for storing the predetermined selection of integration coefficients. The interpolation may, for example, be a linear interpolation.

According to an embodiment of another aspect of the invention there is provided an apparatus for operating a reel-to-reel system of a storage device with a first reel, a second reel, a first motor and a second motor, wherein the first motor is operable to drive the first reel and the second motor is operable to drive the second reel, wherein the reel-to-reel system is operable to transport a tape which is supplied by one of the two reels and which is taken up by the other of the two reels, wherein the apparatus comprises a measurement unit which is operable to determine a current tape velocity of the tape and a current tape tension of the tape between the first reel and the second reel and a current longitudinal displacement of the tape, wherein the longitudinal displacement represents a supplied length of the tape with respect to a predetermined reference point positioned between the first reel and the second reel, an estimator which is operable to estimate an estimated state vector dependent on the current tape velocity and the current tape tension and the current longitudinal displacement, an input reference unit which is operable to determine a reference state vector dependent on a predetermined reference tape velocity and a predetermined reference tape tension, a controller which is operable to determine a first control signal and a second control signal dependent on the estimated state vector and on the reference state vector, wherein the first motor is controlled via the first control signal and wherein the second motor is controlled via the second control signal.

According to an embodiment of another aspect of the invention there is provided a storage device comprising a reel-to-reel system with a first reel, a second reel, a first motor and a second motor, wherein the first motor is operable to drive the first reel and the second motor is operable to drive the second reel, wherein the reel-to-reel system is operable to transport a tape which is supplied by one of the two reels and which is taken up by the other of the two reels, wherein the storage device comprises an apparatus according to the above mentioned embodiment of the invention.

Any of the device features may be applied to the method aspect of the invention and vice versa. Advantages of the device features may apply to corresponding method features and vice versa.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings, in which:

FIG. 8a and FIG. 8b are a series of equations used in the description of the present embodiments.

Different figures may contain identical references, representing elements with similar or uniform content.

DETAILED DESCRIPTION

Figure 1:
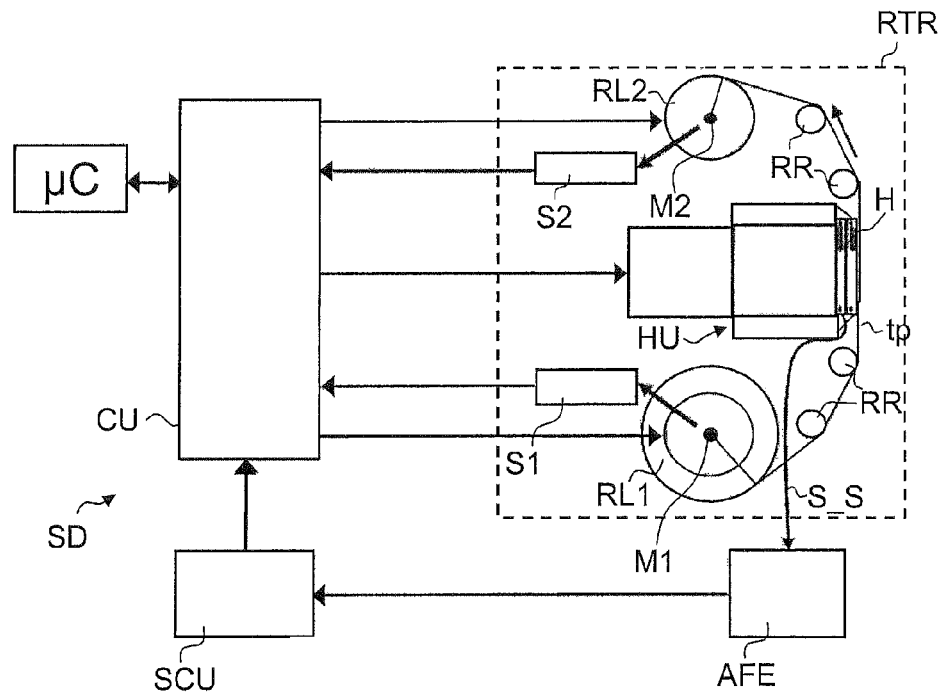
FIG. 1 is a schematic diagram of an exemplary storage device with a reel-to-reel system, suitable for use in accordance with embodiments of the invention.

FIG. 1 shows a reel-to-reel system RTR of a storage device SD that is used for storing data. The data are stored on a tape tp which is transported between a first reel RL1 and a second reel RL2 of the reel-to-reel system RTR. As illustrated in FIG. 1, the first reel RL1 supplies the tape tp. The second reel RL2 takes up the tape tp. The first reel RL1 is driven by a first motor M1 and the second reel RL2 is driven by a second motor M2. In particular, a torque of the first motor M1 is controlled by a first control signal $u_1(t_m)$ and a torque of the second motor M2 is controlled by a second control signal $u_2(t_m)$. Each of the first and second motors M1, M2 may be a DC brushless motor. A tape tension $\hat{T}(t_m)$ of the tape tp between the first reel RL1 and the second reel RL2 and a tape velocity $\hat{v}(t_m)$ (FIG. 4) of the tape tp, while moving from the first reel RL1 to the second reel RL2 and vice versa, may be controlled by providing the first control signal $u_1(t_m)$ and the second control signal $u_2(t_m)$ accordingly. The tape velocity $\hat{v}(t_m)$ may, by way of example, be in a range between about 2 and about 8 m/s (meters per second) and the tape tension $\hat{T}(t_m)$ may, by way of example, be in a range between about 0.75 and about 1.25 newtons (N).

In addition, a first sensor S1 may be associated to the first reel RL1 and a second sensor S2 may be associated to the second reel RL2. Each of the first and second sensor S1, S2 may by way of example comprise a Hall-sensor.

The storage device SD further comprises a head unit HU with a read/write head H to read data from the tape tp and respectively write data on the tape tp. The head H comprises multiple servo-readers each being operable to read prewritten servo-patterns from the tape tp and to provide corresponding servo-signals S_S, which represent the read servo-pattern.

Figure 4:
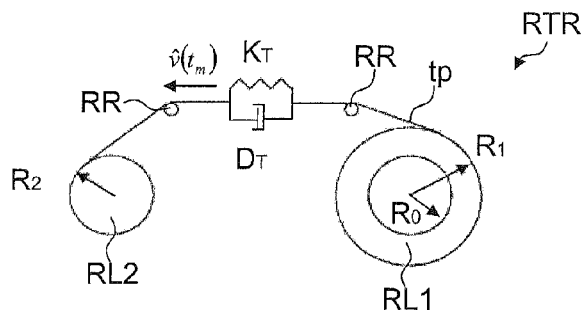
FIG. 4 is another schematic diagram of the reel-to-reel system of FIG. 1.

The storage device SD may also comprise an analog-front-end-module AFE which may by way of example be operable to low-pass-filter and sample the servo-signals S_S and to provide the filtered and sampled servo-signals to a servo-channel unit SCU. The servo-channel unit SCU is by way of example operable to estimate the current tape velocity $\hat{v}(t_m)$ dependent on the filtered and sampled servo-signals. Furthermore, the servo-channel unit SCU may be operable to determine a longitudinal displacement $\hat{l}(t_m)$ of the tape tp and/or the current tape tension $\hat{T}(t_m)$ dependent on the filtered servo-signals. The estimation of the tape tension $\hat{T}(t_m)$ may for example be based on Hooke's law. Thereby, an exemplary embodiment of a measurement unit which is operable to determine the current tape velocity ($\hat{v}(t_m)$) of the tape (tp) and the current tape tension ($\hat{T}(t_m)$) of the tape (tp) between the first reel (RL1) and the second reel (RL2) and the current longitudinal displacement ($\hat{l}(t_m)$) of the tape (tp) may be established. Alternatively or additionally, the reel-to-reel system RTR may comprise tape rollers RR with each comprising a tension sensor, as for example strain-gauge sensor. The rollers RR may, by way of example, be positioned with respect to the head H to enable a constant wrap angle independent of reel radii R1, R2 (FIG. 4). The tension sensors facilitate a direct determination of the current tape tension $\hat{T}(t_m)$.

A controller unit CU is associated with the reel-to-reel system RTR and may be a component of the storage device SD. The controller unit CU is operable to control the first motor M1 and the second motor M2, dependent on the determined tape velocity $\hat{v}(t_m)$ and the determined tape tension $\hat{T}(t_m)$. Alternatively or additionally, the controller unit CU may be operable to at least determine the current tape velocity $\hat{v}(t_m)$ and/or the current tape tension $\hat{T}(t_m)$ dependent on sensor signals provided by the first sensor S1 and the second sensor S2.

Figure 2:
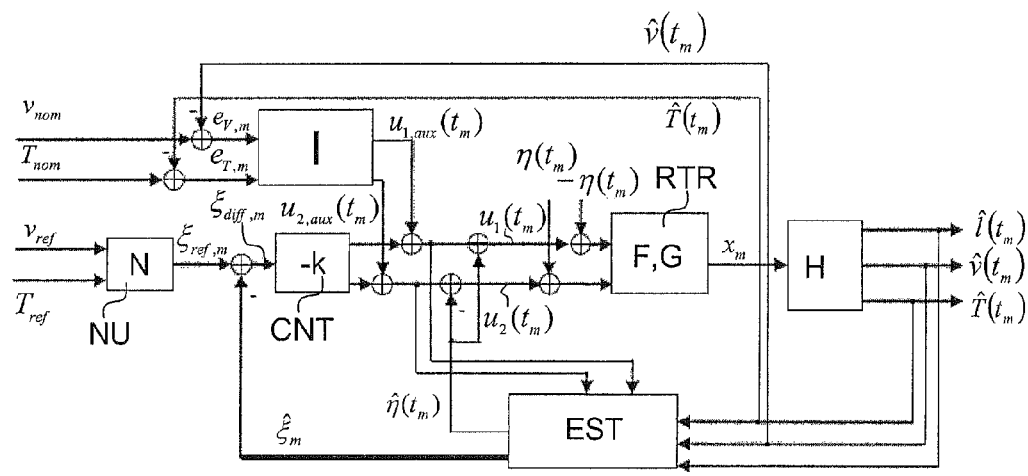
FIG. 2 is a schematic block diagram of a control system for the reel-to-reel system of FIG. 1, in accordance with embodiments of the invention.

FIG. 2 shows a control system for operating the reel-to-reel system RTR. In particular, FIG. 2 shows a predetermined state vector $x_m$ being associated to the reel-to-reel system RTR. The index m represents a specific point in time $t_m$. The state vector $x_m$ comprises multiple vector elements as shown in equation F0 in FIG. 8a, as for example a first linear displacement $x_1(t_m)$ and a first linear reel velocity $\dot{x}_1(t_m)$ at the first reel RL1 and a second linear displacement $x_2(t_m)$ and a second linear reel velocity $\dot{x}_2(t_m)$ at the second reel RL2. The state vector $x_m$ represents a current state, in particular an internal state, of the reel-to-reel system RTR. Contrary to FIG. 2, the state vector $x_m$ and more precisely its vector elements are typically not directly derivable from the actual reel-to-reel system RTR. The state vector $x_m$ in FIG. 2 is shown for the sake of completeness. The state vector $x_m$ is preferably associated to a predetermined full-order model of the reel-to-reel system RTR.

The longitudinal displacement $\hat{l}(t_m)$ represents a supplied length of the tape tp passing a predetermined reference point between the first reel RL1 and the second reel RL2, as for example the head H. Each of the first and the second linear displacement $x_1(t_m)$, $x_2(t_m)$ correlates to the longitudinal displacement $\hat{l}(t_m)$, where the first linear displacement $x_1(t_m)$ is related to the first reel RL1 and the second linear displacement $x_2(t_m)$ is related to the second reel RL2. Each of the longitudinal displacement $\hat{l}(t_m)$ and the first and second linear displacement $x_1(t_m)$, $x_2(t_m)$ may comprise values in an exemplary range between a minimum value, as for example 0 meters (m), and a maximum value, as for example 600 m.

Figure 3:
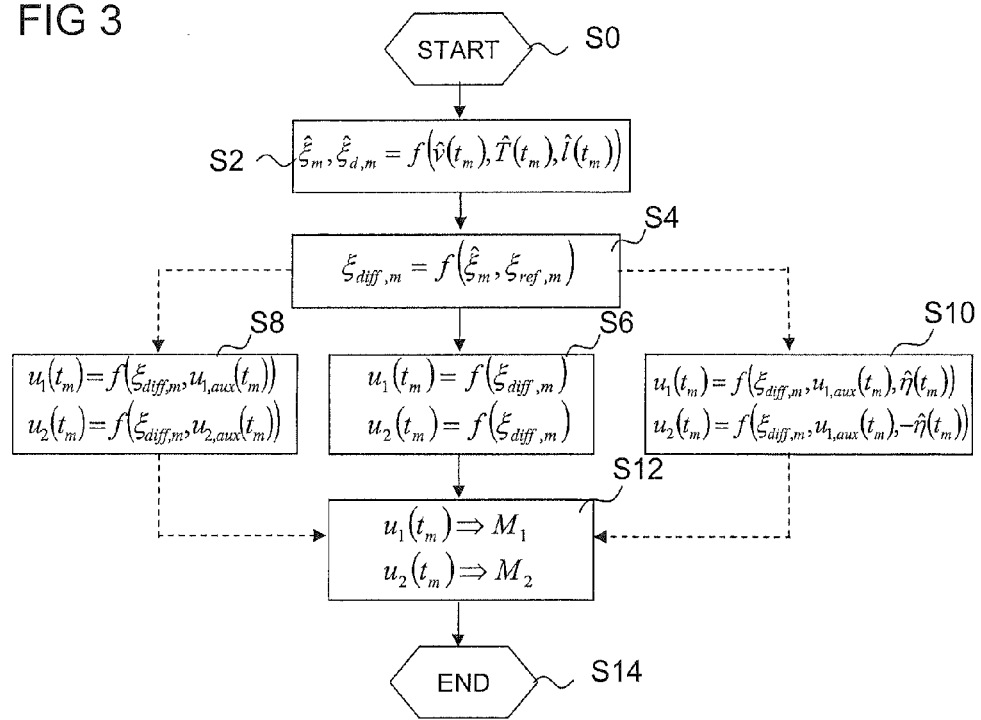
FIG. 3 is a flow diagram illustrating an exemplary operation of the control system of FIG. 2.

The control system is implemented as a state control of the reel-to-reel system RTR and is further described with help of a flow diagram in FIG. 3. The flow diagram (FIG. 3) may be implemented as a software program which is by way of example stored in a memory device associated to the controller unit CU and which is for example executed by an execution unit μC, as for example a microcontroller, being associated to the controller unit CU. The controller unit CU may also be identified as an apparatus for operating the reel-to-reel system RTR.

The execution of the program starts in a step S0. In a step S2 an estimated state vector $\hat{\xi}_m$ is estimated dependent on the beforehand determined tape velocity $\hat{v}(t_m)$ and tape tension $\hat{T}(t_m)$ and longitudinal displacement $\hat{l}(t_m)$. The estimated state vector $\hat{\xi}_m$ may be estimated in such a way that it is associated to the full-order model of the reel-to-reel system RTR. Hence, the estimated state vector $\hat{\xi}_m$ is basically identical to the state vector $x_m$ and its number of associated vector elements is identical to the number of vector elements of the state vector $x_m$.

Alternatively, the estimated state vector $\hat{\xi}_m$ may be estimated in such a way that it is associated to a predetermined reduced-order model of the reel-to-reel system RTR. In this context, the number of vector elements associated to the estimated state vector $\hat{\xi}_m$ is typically less than the number of vector elements associated to the state vector $x_m$ as illustrated in equations F0, F2 in FIG. 8a.

The estimated state vector $\hat{\xi}_m$ may be estimated by using an estimator EST (FIG. 2) which implements a predetermined model of the reel-to-reel system RTR that is either the full-order model or the reduced-order model. The model of the reel-to-reel system RTR is derived from equations F4, F6 in FIG. 8a.

The equations F4, F6 are based on the assumption that the tape tp can be modeled as a spring with a spring constant $K_T$ in units [N/m] and a damper with a damper coefficient $D_T$ in units [Ns/m] as depicted in FIG. 4. The second order differential equations F4, F6 are obtained by equating for each motor the change in angular momentum to the sum of torques. The equations F4, F6 consider a viscous friction coefficient $\beta_1$, $\beta_2$ for each motor M1, M2 in units [Nms] and a nondimensional Coulomb friction coefficient μ. The externally applied torque is expressed by a product of the particular control signal $u_1(t_m)$, $u_2(t_m)$ and the associated motor driver gain $K_1$, $K_2$ in units [Nm/A]. The first reel radius R1 is associated to the first reel RL1 and the second reel radius R2 is associated to the second reel RL2. A time dependency of both reel radii R1, R2 when moving the tape has been neglected in equations F4, F6, as dynamics of changes of both radii R1, R2 are much slower than dynamics of the tape tension $\hat{T}(t_m)$ and the tape velocity $\hat{v}(t_m)$.

A first reel inertia $J_1$ of the first reel RL1 is expressed by equation F8 including a first motor inertia $J_{1,motor}$ and a first clutch inertia $J_{1,clutch}$. A second reel inertia $J_2$ of the second reel RL2 is expressed by equation F10 including a second motor inertia $J_{2,motor}$ and a second clutch inertia $J_{2,clutch}$. Furthermore, both reel inertias $J_1$, $J_2$ include a predetermined tape density ρ in units [Kg/m$^3$] and a predetermined tape width wh in unit [m]. A radius R0 represents a radius of a particular empty reel as illustrated in FIG. 4.

The differential equations according to equations F4, F6 can be transformed into state space form which is expressed by equation F12 comprising an input vector $u_m$ (equation F14), a system matrix F (F16) and an input matrix G (F18).

An output vector $y_m$ (F20) is represented by the tape velocity $\hat{v}(t_m)$ and by the tape tension $\hat{T}(t_m)$ and is expressed in terms of the state vector $x_m$ and an output matrix H. A measurement noise vector $w_m$ represents a measurement noise. The system matrix F, the input matrix G and the output matrix H give a state space representation of the reel-to-reel system RTR and represent the full-order model of the reel-to-reel system RTR and can be identified as full-order matrices.

Alternatively, the reduced-order model of the reel-to-reel system RTR may be adopted for the estimator EST to reduce a complexity of the reel-to-reel system RTR for the further processing. In this context, by way of example, a balanced model reduction may be executed on the state space form in equation F12 beforehand to obtain a reduced-order system matrix Φ, a reduced-order input matrix Γ and a reduced-order output matrix Ξ which represent the reduced-order model of the reel-to-reel system RTR and which can be identified as reduced-order matrices.

The balanced model reduction may for example be used to obtain the reduced-order matrices and is based on a retainment of high energy states while low energy states are discarded. The balanced model reduction is obtained by observing Hankel singular values of the reel-to-reel system RTR, which provide a measure of the energy for each state. Hankel singular values are calculated as square roots of eigenvalues for a product of a controllability Gramian and an observability Gramian of the system. The observation of the Hankel singular values of the reel-to-reel system RTR suggests that an order of the model of the reel-to-reel system RTR can be reduced from for example four to three. The order of the model and the number of vector elements of the estimated state vector $\hat{\xi}_m$ typically correlate to a predetermined number of state variables in the reel-to-reel system RTR, each associated with a property of storing energy, as for example the first and second reel RL1, RL2, each representing flywheel energy storage, and the tape tp itself, representing a spring energy storage.

This results in a dimension of the system matrix F, as for example 4×4 (F16), that is reduced compared to a dimension of the associated reduced-order system matrix Φ, as for example 3×3. Furthermore, the dimension of the input matrix G, as for example 4×2 in (F18), is reduced compared to the dimension of the associated reduced-order input matrix Γ, as for example 3×2. In addition, the dimension of the output matrix H, as for example 2×4 in (F20), is reduced compared to the dimensions of the associated reduced-order output matrix Ξ, as for example 2×3.

In step S2, the estimated state vector $\hat{\xi}_m$ is, for example, estimated based on the reduced-order matrices without limiting the further description to the reduced-order model of the reel-to-reel system RTR.

The estimated state vector $\hat{\xi}_m$ may be based on Kalman estimation as shown in equations F22, F24 in FIG. 8b. Equation F22 represents a measurement update for calculating the estimated state vector $\hat{\xi}_m$. Equation F24 represents a time update for calculating an intermediate state vector $\bar{\xi}_m$ which is used in the calculation of the measurement update. The time update and measurement update are calculated in turn. The index m represents a specific point in time $t_m$ and an index m+1 represents a subsequent point in time $t_{m+1}$. Without model reduction, the reduced-order matrices in equations F22, F24 are replaced by the associated full-order matrices. The gain matrix $L(\sigma_n^2, \sigma_w^2)$ represents a Kalman gain, which for example depends on a process noise variance $\sigma_n^2$ of a process noise and of a measurement noise variance $\sigma_n^2$ of the measurement noise.

The reduced-order matrices used for the estimation of the estimated state vector $\hat{\xi}_m$ can be identified as a predetermined set of matrices. Prior to the estimation of the estimated state vector $\hat{\xi}_m$ the predetermined set of matrices may be selected from a predetermined selection of matrices, in particular of reduced-order matrices, in step S2. The predetermined set of matrices is selected dependent on the longitudinal displacement $\hat{l}(t_m)$. The predetermined selection of matrices is preferably stored in a storage memory of the storage device SD.

Alternatively or additionally, at least two matrices are selected from the predetermined selection of matrices dependent on the longitudinal displacement $\hat{l}(t_m)$. At least one of the matrices of the predetermined set of matrices, in particular the reduced-order system matrix $\Phi$ and/or the reduced-order input matrix $\Gamma$ and/or the reduced-order output matrix $\Xi$, may be interpolated based on the at least two selected matrices. The number of selected matrices correlates to the number of matrices of the predetermined set of matrices being interpolated.

The foregoing is also valid for an implemented full-order model of the reel-to-reel system RTR. In this case, the predetermined set of matrices is represented by the full-order matrices and the predetermined selection of matrices comprises full-order matrices.

Figure 5A:
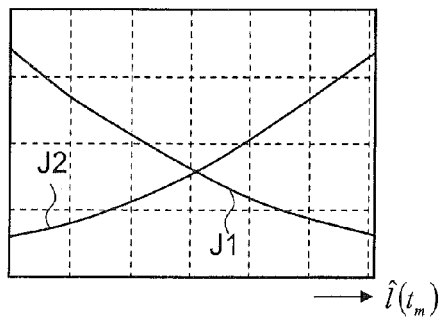
FIG. 5a is a graph illustrating reel moments of inertia versus longitudinal displacement.
Figure 5B:
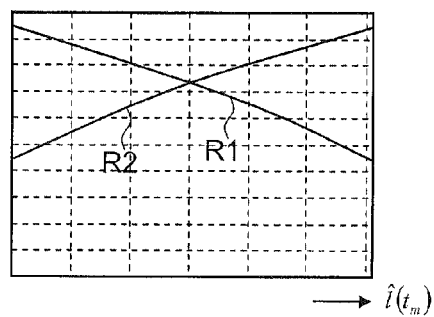
FIG. 5b is a graph illustrating reel radii behavior versus longitudinal displacement.

By selecting and/or interpolating the particular matrix or matrices, the variance of the reel-to-reel system RTR due to the time varying radii R1, R2 when tape tp moves may be incorporated in the estimation of the estimated state vector $\hat{\xi}_m$. FIG. 5a illustrates the variation of the reel inertia J1, J2 versus the longitudinal displacement $\hat{l}(t_m)$ which result from the dependency of the reel radii R1, R2 on the longitudinal displacement $\hat{l}(t_m)$ as shown in FIG. 5b. The larger the particular reel radius the larger is the associated reel inertia.

In step S4 a reference state vector $\xi_{ref,m}$ is determined dependent on a predetermined reference tape velocity $v_{ref}$ and on a predetermined reference tape tension $T_{ref}$. A difference state vector $\xi_{diff,m}$ is determined as a difference of the estimated state vector $\hat{\xi}_m$ and the reference state vector $\xi_{ref,m}$. The reference state vector $\xi_{ref,m}$ has the same order as the estimated state vector $\hat{\xi}_m$. An input reference unit NU is operable to calculate the input reference vector $\xi_{ref,m}$ dependent on a predetermined input reference matrix N (FIG. 2).

The input reference matrix N may be selected from a predetermined selection of input reference matrices dependent on the longitudinal displacement $\hat{l}(t_m)$. Alternatively or additionally, at least two matrices are selected from the predetermined selection of input reference matrices dependent on the longitudinal displacement $\hat{l}(t_m)$. The input reference matrix N is interpolated based on the at least two selected matrices.

In step S6 the first control signal $u_1(t_m)$ and the second control signal $u_2(t_m)$ are calculated dependent on the difference state vector $\xi_{diff,m}$. The calculation of both control signals $u_1(t_m)$, $u_2(t_m)$ may be executed by a controller CNT, which calculates both control signals $u_1(t_m)$, $u_2(t_m)$ based on a predetermined controller matrix K (FIG. 2). The controller matrix K may be an optimum quadratic Gaussian controller (LQG) matrix.

The controller matrix K may be selected from a predetermined selection of controller matrices dependent on the longitudinal displacement $\hat{l}(t_m)$. Alternatively or additionally, at least two matrices are selected from the predetermined selection of controller matrices dependent on the longitudinal displacement $\hat{l}(t_m)$. The controller matrix K is interpolated based on the at least two selected matrices.

Alternatively or additionally, the first and second control signal $u_1(t_m)$, $u_2(t_m)$ may be calculated by incorporating also a first auxiliary control signal $u_{1,aux}(t_m)$ and/or a second auxiliary control signal $u_{2,aux}(t_m)$ as illustrated in step S8. The first auxiliary control signal $u_{1,aux}(t_m)$ may be added to a first output of the controller CNT which is associated to the first control signal $u_1(t_m)$ (FIG. 2). The second auxiliary control signal $u_{2,aux}(t_m)$ may be added to a second output of the controller CNT which is associated to the second control signal $u_2(t_m)$ (FIG. 2). The first and second auxiliary control signal $u_{1,aux}(t_m)$, $u_{2,aux}(t_m)$ may be calculated by an integrator I (FIG. 2) based on a tape velocity deviation $e_{v,m}$ and on a tape tension deviation $e_{T,m}$. The tape velocity deviation $e_{v,m}$ represents a difference between a predetermined nominal tape velocity $v_{nom}$ and the determined tape velocity $\hat{v}(t_m)$. The tape tension deviation $e_{T,m}$ represents a difference between a predetermined nominal tape tension $T_{nom}$ and the determined tape tension $\hat{T}(t_m)$. The nominal tape velocity $v_{nom}$ correlates to the reference tape velocity $v_{ref}$ in such a way, that both velocities are based on a first predetermined linear tape velocity $\dot{x}_{1,ref,m}$ at the first reel RL1 and on a second predetermined tape velocity $\dot{x}_{2,ref,m}$ at the second reel RL2 as illustrated in equation F26. The nominal tape tension $T_{nom}$ correlates to the reference tape tension $T_{ref}$ in such a way, that both tensions are based on a first predetermined linear tape displacement $x_{1,ref,m}$ at the first reel RL1 and on a second predetermined tape displacement $x_{2,ref,m}$ at the second reel RL2 as illustrated in equation F28.

A two-dimensional integrator output vector $u_{int,m}$ of the integrator I is, for example, given in equation F30. A subsequent vector $\sigma_{m+1}$ is recursively obtained by integrating the tape velocity deviation $e_{v,m}$ and the tape tension deviation $e_{T,m}$ as shown in equation F32. The vector $\sigma_m$ is multiplied with integrator matrix $\Im$ which includes predetermined integration constants $\alpha_1$, $\beta_1$, $\gamma_1$, $\delta_1$. The integration constants $\gamma_1$, $\delta_1$ are preferably obtained from the constants $\alpha_1$, $\beta_1$, as for example $\gamma_1 = -\beta_1$, and $\delta_1 = \alpha_1$, as shown in equation F30.

Prior to the estimation of the first and second auxiliary control signal $u_{1,aux}(t_m)$, $u_{2,aux}(t_m)$ the integration coefficients $\alpha_1$, $\beta_1$ may be selected from a predetermined selection of integration coefficients dependent on the longitudinal displacement $\hat{l}(t_m)$. The tape velocity deviation $e_{v,m}$ and/or the tape tension deviation $e_{T,m}$ is then integrated dependent on the selected integration coefficients $\alpha_1$, $\beta_1$. Alternatively or additionally, the integration coefficients $\alpha_1$, $\beta_1$ may be interpolated based on integration coefficients being selected from the predetermined selection of integration coefficients beforehand.

Alternatively or additionally, the determination of the first and second control signal $u_1(t_m)$, $u_2(t_m)$ may incorporate at least one estimated input equivalent tension disturbance value $\hat{\eta}(t_m)$ as illustrated in step S10.

As shown in FIG. 2, periodic tension disturbances $\eta(t_m)$ may disturb the behavior of the reel-to-reel system RTR. The periodic tension disturbance $\eta(t_m)$ represents a variation of the tape tension. In a steady state velocity mode, variations of the tape tension $\hat{T}(t_m)$ around the nominal tape tension $T_{nom}$ are induced by for example eccentricities of at least one reel. In tape transport, this problem is particularly serious when reel rotation frequencies are near a resonance frequency determined by the tape path. The periodic tension disturbance $\eta(t_m)$ may affect a position error signal and hence a performance of track following servo.

A suppression of the at least one periodic tension disturbance $\eta(t_m)$ is obtained by augmenting the particular model of the reel-to-reel system RTR in the estimator EST with a model of sinusoidal disturbances which is represented by a disturbance vector $\hat{\xi}_{d,m}$ (F34, F36 in FIG. 8b). Modeling of the sinusoidal disturbances is obtained by assuming that an i-th sinusoidal disturbance having a frequency $\omega_i$ is modeled in continuous time as expressed in equation F38 in FIG. 8b.

In equation F34, a first model matrix $\Phi$ has preferably a dimension of 2n×2n, and a second model matrix $H_d$ has for example a dimension of 1×2n, where n represents a number of sinusoidal disturbances. For example, if only the first reel RL1 exhibits eccentricities, the number of sinusoidal disturbances n will be set to 1. In this case the first model matrix $\Phi_d$ has the dimension 2×2 (F40) and the second model matrix $H_d$ has the dimension 1×2 (F42). The number of sinusoidal disturbances n correlates to the number of sinusoidal disturbances. A gain factor g determines a convergence of the suppression of the sinusoidal disturbances.

The reduced-order system matrix $\Phi$, the reduced-order input matrix $\Gamma$, the first model matrix $\Phi_d$ and the second model matrix $H_d$ form an augmented system matrix $\Phi_{aug}$ (F34 in FIG. 8b). The reduced-order input matrix $\Gamma$ form an augmented input matrix $\Gamma_{aug}$ (F34 in FIG. 8b) and the reduced-order output matrix $\Xi$ form an augmented output matrix $H_{aug}$ (F36 in FIG. 8b). The augmented system matrix $\Phi_{aug}$, the augmented input matrix $\Gamma_{aug}$ and the augmented output matrix $H_{aug}$ can be identified as augmented matrices.

Equation F34 in FIG. 8b represents an augmented state space form. The output vector $y_m$ includes the augmented output matrix $H_{aug}$ (F36). If no model reduction is used, the augmented matrices may instead include the particular full-order matrices.

The augmented matrices used for the estimation of the estimated state vector $\hat{\xi}_m$ can be identified as a predetermined set of augmented matrices. Prior to the estimation of the state vector $\hat{\xi}_m$ and the disturbance vector $\hat{\xi}_{d,m}$ the predetermined set of augmented matrices may be selected from a predetermined selection of augmented matrices. The predetermined set of augmented matrices is selected dependent on the longitudinal displacement $\hat{l}(t_m)$.

Alternatively or additionally, at least two augmented matrices are selected from the predetermined selection of augmented matrices dependent on the longitudinal displacement $\hat{l}(t_m)$. At least one of the augmented matrices of the predetermined set of augmented matrices, in particular the augmented system matrix $\Phi_{aug}$ and/or the augmented input matrix $\Gamma_{aug}$ and/or the augmented output matrix $H_{aug}$, may be interpolated based on the at least two selected augmented matrices. The number of selected augmented matrices correlates to the number of matrices of the predetermined set of matrices being interpolated.

As denoted in step S2, the estimation, in particular the Kalman estimation, of the estimator EST is augmented to also estimate the disturbance vector $\hat{\xi}_{d,m}$ in parallel to the estimation of the estimated state vector $\hat{\xi}_m$ (F44, F46). Equation F44 represents the augmented measurement update and equation F46 represents the augmented time update of the Kalman estimation processed in the estimator EST. The estimation in equations F44, F46 is based on the reduced-order matrices and includes an augmented gain matrix $L_{aug}$ ($\sigma_n^2$, $\sigma_w^2$). If no model reduction is implemented, the augmented matrices may instead include the particular full-order matrices as already described in terms of the augmented state space form in equation F34, F36.

Based on the estimated disturbance vector $\hat{\xi}_{d,m}$ the at least one input equivalent tension disturbance value $\hat{\eta}(t_m)$ can be calculated. If the number of sinusoidal disturbances n equals 1, the input equivalent tension disturbance value $\hat{\eta}(t_m)$ is calculated according to equation F48. In this case, the input equivalent tension disturbance value $\hat{\eta}(t_m)$ represents a result of a scalar product of the disturbance vector $\hat{\xi}_{d,m}$ with the second model matrix $H_d$ of equation F42 representing a row vector. For a number of sinusoidal disturbances n larger than 1, the input equivalent tension disturbance value $\hat{\eta}(t_m)$ that is obtained from the estimator is a scalar value, as it represents the total contribution of the number of sinusoidal disturbances n (F50).

In step S12 the determined first control signal $u_1(t_m)$ is provided to the first motor $M_1$ and the determined second control signal $u_2(t_m)$ is provided to the second motor $M_2$. The execution of the software program stops in step S14. Preferably, the program execution restarts in step S2.

The particular interpolations of the matrices named herein may for example be a linear interpolation.

Figure 6:
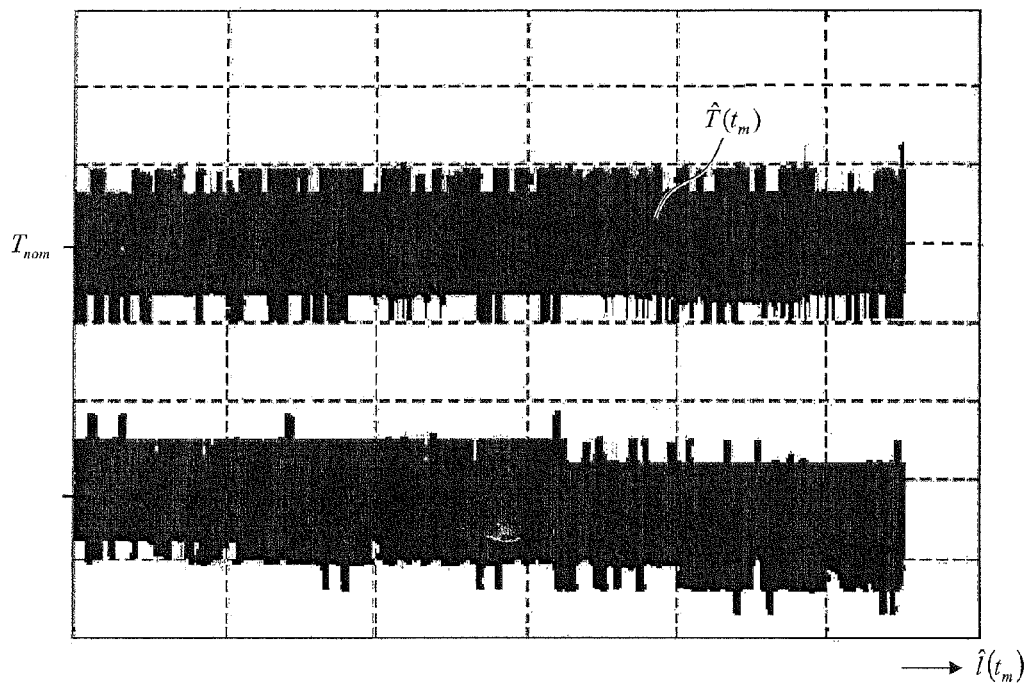
FIG. 6 is a graph illustrating tape tension behavior versus longitudinal displacement.

FIG. 6 shows the behavior of the tape tension $\hat{T}(t_m)$ versus the longitudinal displacement $\hat{l}(t_m)$. The nominal tape tension $T_{nom}$ is set to a predetermined value, for example 1 N. An upper plot represents a course of the tape tension $\hat{T}(t_m)$ being controlled according to an embodiment of the invention. A bottom plot represents a course of tension being not controlled according to embodiments of the invention. As depicted in the upper plot the tape tension $\hat{T}(t_m)$ varies about the nominal tape tension $T_{nom}$ but do not involve a drift with increasing longitudinal displacement values $\hat{l}(t_m)$. The bottom plot involves a tension offset and a drift towards decreasing tape tension value with increasing longitudinal displacement values $\hat{l}(t_m)$.

Figure 7:
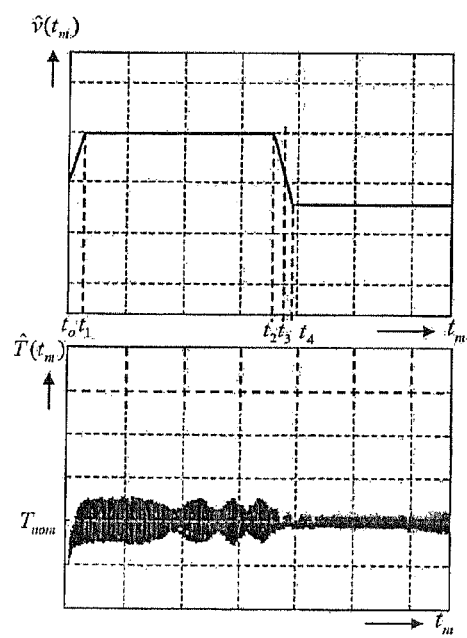
FIG. 7 is series of four graph illustrating tape velocity and tension behavior versus time.
Figure 7:
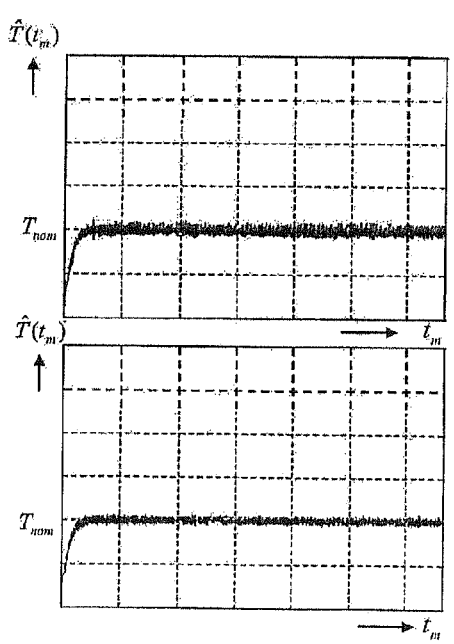

FIG. 7 depicts four diagrams. The upper diagram on the left side shows a course of the tape velocity $\hat{v}(t_m)$ versus the time $t_m$. The course of the tape velocity $\hat{v}(t_m)$ is for example predetermined by the corresponding prescribed reference tape velocity $v_{ref}$. The reference tape velocity $\hat{v}_{ref}$ prescribes for example a course of the tape velocity $\hat{v}(t_m)$ ramping up from the point of time t0 to t1. The tape velocity $\hat{v}(t_m)$ stays constant between the point of time t1 to t2 and ramps down between the points of time t2 to t4. In the point of time t3 the tape transport direction reverses.

The bottom diagram on the left side shows the resulting course of the tape tension $\hat{T}(t_m)$ versus the time $t_m$ based on the prescribed reference tape velocity $v_{ref}$ shown in the upper diagram on the left side. The nominal tape tension $T_{nom}$ is predetermined to, for example, 1 N. The course of the tape tension $\hat{T}(t_m)$ shows overshoots and undershoots and results from matrix parameters of the matrices used in the estimator EST, which do not properly match the matrix parameters of the actual reel-to-reel system RTR.

The upper diagram of the right side correlates to the illustration of the left diagram on the left side except that the course of the tape tension $\hat{T}(t_m)$ shows no overshoots and undershoots and results from matrix parameters of the matrices used in the estimator EST which do match the matrix parameters of the actual reel-to-reel system RTR.

Compared to the upper diagram on the right side, the bottom diagram of the right side shows a more reduced variance of the tape tension $\hat{T}(t_m)$ versus the time $t_m$. This results from the additional suppression of periodic disturbances $\eta(t_m)$.

Although the invention has been described through some exemplary embodiments, the invention is not limited to such embodiments. It is apparent that those skilled in the art can make various modifications and variations to the present invention without departing from the scope of the present invention. The present invention is intended to cover these modifications and variations provided that they fall in the scope of protection defined by the following claims or their equivalents.

LIST OF REFERENCES $\hat{v}(t_m)$ tape velocity
$\hat{T}(t_m)$ tape tension
$\hat{l}(t_m)$ longitudinal displacement
$\xi_m$ estimated state vector
$\xi_{diff,m}$ difference state vector
$\xi_{ref,m}$ reference state vector
$\dot{x}_1(t_m)$ first linear reel velocity
$\dot{x}_2(t_m)$ second linear reel velocity
$\sigma_w^2$ variance of the measurement noise
$\sigma_n^2$ variance of a process noise
$\dot{x}_{1,ref,m}$ first reference linear tape velocity
$\dot{x}_{2,ref,m}$ second reference linear tape velocity
$u_{int,m}$ output vector of integrator
$T_{nom}$ nominal tape tension
$T_{ref}$ reference tape tension
$u_1(t_m)$ first control signal
$u_{1,aux}(t_m)$ first auxiliary control signal
$u_2(t_m)$ second control signal
$u_{2,aux}(t_m)$ second auxiliary control signal
$v_{nom}$ nominal tape velocity
$v_{ref}$ reference tape velocity
$x_{1,ref,m}$ first reference linear tape displacement
$x_{2,ref,m}$ second reference linear tape displacement
$\Im$ integration matrix
$\hat{\eta}(t_m)$ input equivalent tension disturbance value
$\eta_m$ input equivalent tension disturbance vector
$\eta(t_m)$ periodic tension disturbance
$\omega_i$ frequency of sinusoidal disturbance
$\xi_{d,m}$ disturbance vector
$\tilde{\xi}_m$ intermediate state vector
$\Phi$ reduced-order system matrix
$\Gamma$ reduced-order input matrix
$\Xi$ reduced-order output matrix
$L(\sigma_n^2, \sigma_w^2)$ gain matrix
$\alpha_1, \beta_1, \gamma_1, \delta_1$ integration coefficients
$J_{1,clutch}, J_{2,clutch}$ inertia of clutch
$J_{1,motor}, J_{2,motor}$ inertia of motor
AFE analog-front-end-module
CNT controller
CU controller unit
$D_T$ damper coefficient
EST estimator
$e_{T,m}$ tape tension deviation
$e_{v,m}$ tape velocity deviation
F system matrix
F, G, H full-order matrices
g gain factor
G input matrix
H head
H output matrix
HU head unit
I integrator
$J_1$ first reel inertia
$J_2$ second reel inertia
K controller matrix
$K_1$ driver gain of first motor
$K_2$ driver gain of second motor
$K_T$ spring constant
M1 first motor
M2 second motor
N input reference matrix
n number of sinusoidal disturbances
NU input reference unit
R0 radius of empty reel
R1 radius of first reel
R2 radius of second reel
RL1 first reel
RL2 second reel
RR tape rollers
RTR reel-to-reel system
S_S servo-signals
S1 first sensor
S2 second sensor
SCU servo-channel unit
SD storage device
tp tape
μC execution unit
$u_m$ input vector
wh tape width
$w_m$ measurement noise vector
$x_1(t_m)$ first linear displacement
$x_2(t_m)$ second linear displacement
$x_m$ state vector
$y_m$ output vector
$\beta_1, \beta_2$ viscous friction coefficient
μ Coulomb friction coefficient
ρ tape density
$\Phi, \Gamma, \Xi$ reduced-order matrices
$\Phi_{aug}, \Gamma_{aug}, H_{aug}$ augmented matrices
$\Phi_d, H_d$ model matrices

The invention claimed is:

1. A method for operating a reel-to-reel system of a storage device having a first reel, a second reel, a first motor and a second motor, wherein the first motor is operable to drive the first reel and the second motor is operable to drive the second reel, and wherein the reel-to-reel system (RTR) is operable to transport a tape which is supplied by one of the first and second reels, and which is taken up by the other of the first and second reels, the method comprising:
   determining a tape velocity of the tape and a tape tension of the tape between the first reel and the second reel, and determining a longitudinal displacement of the tape, wherein the longitudinal displacement represents a supplied length of the tape with respect to a predetermined reference point positioned between the first reel and the second reel;
   estimating an estimated state vector based on the tape velocity, tape tension and longitudinal displacement;
   determining a reference state vector based on a predetermined reference tape velocity and on a predetermined reference tape tension;
   generating a first control signal and a second control signal based on the estimated state vector and the reference state vector; and
   using the first control signal to control the first motor and the second control signal to control the second motor.

2. The method of claim 1, further comprising:
   selecting a predetermined set of matrices from a predetermined selection of matrices dependent on the longitudinal displacement; and
   estimating the estimated state vector based on the selected set of matrices.

3. The method of claim 2, wherein the predetermined matrices of the predetermined selection of matrices are selected based on the longitudinal displacement, and at least one matrix of the predetermined set of matrices is interpolated based on the selected predetermined matrices.

4. The method of claim 3, wherein the estimated state vector is estimated based on the selected predetermined set of matrices such that a number of vector elements of the estimated state vector is less than an order of a predetermined full-order model of the reel-to-reel system.

5. The method of claim 1, further comprising:
selecting a controller matrix from a predetermined selection of controller matrices based on the longitudinal displacement; and
determining the first control signal and the second control signal based on the selected controller matrix.

6. The method of claim 1, further comprising:
selecting predetermined matrices of a predetermined selection of controller matrices based on the longitudinal displacement;
interpolating a controller matrix based on the selected predetermined matrices; and
generating the first control signal and the second control signal based on the interpolated controller matrix.

7. The method of claim 1, further comprising:
selecting an input reference matrix from a predetermined selection of input reference matrices based on the longitudinal displacement; and
determining the reference state vector dependent on the selected input reference matrix.

8. The method of claim 1, further comprising:
selecting predetermined matrices of a predetermined selection of input reference matrices based on the longitudinal displacement;
interpolating an input reference matrix based on the selected predetermined matrices; and
determining the reference state vector based on the interpolated input reference matrix.

9. The method of claim 1, further comprising:
estimating at least one input equivalent tension disturbance value of the tape based on the tape velocity, the tape tension, and the current longitudinal displacement, wherein the at least one input equivalent tension disturbance value represents at least one periodic tension disturbance of the tape; and
generating the first control signal and the second control signal based on the at least one input equivalent tension disturbance value.

10. The method of claim 1, further comprising:
selecting a predetermined set of augmented matrices from a predetermined selection of augmented matrices based on the longitudinal displacement; and
estimating the at least one input equivalent tension disturbance value and the estimated state vector based on the selected set of augmented matrices.

11. The method of claim 10, further comprising:
selecting predetermined matrices of the predetermined selection of augmented matrices based on the longitudinal displacement; and
interpolating at least one matrix of the predetermined set of augmented matrices based on the selected predetermined matrices.

12. The method of claim 1, further comprising:
determining a tape velocity deviation based on a difference between the tape velocity and a predetermined nominal tape velocity, which is associated with the predetermined reference tape velocity;
determining a tape tension deviation (based on a difference between the tape tension and a predetermined nominal tape tension, which is associated with the predetermined reference tape tension;
integrating the tape velocity deviation and the tape tension deviation;
generating a first auxiliary control signal and a second auxiliary control signal based on the integration of the tape velocity deviation and the tape tension deviation;
generating the first control signal based on the first auxiliary control signal; and
generating the second control signal based on the second auxiliary control signal.

13. The method of claim 12, further comprising:
selecting predetermined integration coefficients from a predetermined selection of integration coefficients based on the longitudinal displacement; and
integrating the tape velocity deviation and the tape tension deviation based on the selected integration coefficients.

14. The method of claim 13, further comprising:
selecting predetermined coefficients of a predetermined selection of integration coefficients based on the longitudinal displacement;
interpolating integration coefficients based on the selected coefficients; and
integrating the tape velocity deviation and the tape tension deviation based on the interpolated integration coefficients.

* * * * *